US010565119B2

United States Patent
Schmidt et al.

(10) Patent No.: US 10,565,119 B2
(45) Date of Patent: Feb. 18, 2020

(54) SMR DRIVE THAT MAINTAINS PHYSICAL LOCATIONS OF BANDS VIA FLUSH/COPY OPERATIONS

(71) Applicants: KABUSHIKI KAISHA TOSHIBA, Tokyo (JP); Toshiba Electronic Devices & Storage Corporation, Tokyo (JP)

(72) Inventors: Thorsten Schmidt, Livermore, CA (US); Richard M. Ehrlich, Saratoga, CA (US); Fernando Anibal Zayas, Rangiora (NZ)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 113 days.

(21) Appl. No.: 15/919,089

(22) Filed: Mar. 12, 2018

(65) Prior Publication Data
US 2019/0278711 A1    Sep. 12, 2019

(51) Int. Cl.
G06F 12/02 (2006.01)
G06F 12/06 (2006.01)
G06F 12/0871 (2016.01)
G11B 5/012 (2006.01)

(52) U.S. Cl.
CPC ...... *G06F 12/0871* (2013.01); *G06F 12/0253* (2013.01); *G06F 12/0646* (2013.01); *G06F 2212/1041* (2013.01); *G06F 2212/283* (2013.01); *G06F 2212/313* (2013.01); *G06F 2212/601* (2013.01); *G06F 2212/604* (2013.01); *G11B 5/012* (2013.01); *G11B 2220/2516* (2013.01)

(58) Field of Classification Search
None
See application file for complete search history.

(56) References Cited

U.S. PATENT DOCUMENTS 9,454,990 B1     9/2016  Fukuhisa
2014/0055881 A1  2/2014  Zaharris
2017/0249969 A1  8/2017  Aiello et al.

*Primary Examiner* — Christopher D Birkhimer
(74) *Attorney, Agent, or Firm* — Kim & Stewart LLP

(57) ABSTRACT

When a shingled magnetic recording (SMR) hard disk drive (HDD) performs additional SMR band copy and/or flush operations to ensure that data associated with logical bands that are adjacent or proximate in logical space are stored in physical locations in the SMR HDD that are proximate in physical space. As a result, efficient execution is ensured of read commands that span multiple logical bands of the SMR HDD.

20 Claims, 13 Drawing Sheets

| Physical Band | Logical Band | LBA Range |
|---|---|---|
| 0 | 4 | 80,000-99,999 |
| 1 | 2 | 40,000-59,999 |
| 2 | 0 | 0-19,999 |
| 3 | N-1 | 210,000-229,999 |
| 4 | 1 | 20,000-39,999 |
| ⋮ | ⋮ | ⋮ |
| N-1 | N (SPARE) | N/A |
| N | 3 | 60,000-79,999 |

FIG. 8A

| Physical Band | Logical Band | LBA Range |
|---|---|---|
| 0 | 4 | 80,000-99,999 |
| 1 | 2 | 40,000-59,999 |
| 2 | 0 | 0-19,999 |
| 3 | N-1 | 210,000-229,999 |
| 4 | 1 | 20,000-39,999 |
| ⋮ | ⋮ | ⋮ |
| N-1 | N (SPARE) | N/A |
| N | 3 | 60,000-79,999 |

FIG. 8B

| Physical Band | Logical Band | LBA Range |
|---|---|---|
| 0 | 4 | 80,000-99,999 |
| 1 | 2 | 40,000-59,999 |
| 2 | 0 | 0-19,999 |
| 3 | N-1 | 210,000-229,999 |
| 4 | 1 | 20,000-39,999 |
| ⋮ | ⋮ | ⋮ |
| N-1 | N (SPARE) | N/A |
| N | 3 | 60,000-79,999 |

FIG. 8C

| Physical Band | Logical Band | LBA Range |
|---|---|---|
| 0 | 4 | 80,000-99,999 |
| 1 | 2 | 40,000-59,999 |
| 2 | 0 | 0-19,999 |
| 3 | N-1 | 210,000-229,999 |
| 4 | 1 | 20,000-39,999 |
| ⋮ | ⋮ | ⋮ |
| N-1 | 4 | 80,000-99,999 |
| N | 3 | 60,000-79,999 |

FIG. 8D

| Physical Band | Logical Band | LBA Range |
|---|---|---|
| 0 | 0 | 0-19,999 |
| 1 | 2 | 40,000-59,999 |
| 2 | 0 | 0-19,999 |
| 3 | N-1 | 210,000-229,999 |
| 4 | 1 | 20,000-39,999 |
| ⋮ | ⋮ | ⋮ |
| N-1 | 4 | 80,000-99,999 |
| N | 3 | 60,000-79,999 |

FIG. 8E

| Physical Band | Logical Band | LBA Range |
|---|---|---|
| 0 | 0 | 0-19,999 |
| 1 | 2 | 40,000-59,999 |
| 2 | N (SPARE) | N/A |
| 3 | N-1 | 210,000-229,999 |
| 4 | 1 | 20,000-39,999 |
| ⋮ | ⋮ | ⋮ |
| N-1 | 4 | 80,000-99,999 |
| N | 3 | 60,000-79,999 |

FIG. 8F 520 620 1000

| Physical Band | Logical Band | LBA Range |
|---|---|---|
| 0 | 4 | 80,000-99,999 |
| 1 | 2 | 40,000-59,999 |
| 2 | 0 | 0-19,999 |
| 3 | N-1 | 210,000-229,999 |
| 4 | 1 | 20,000-39,999 |
| ⋮ | ⋮ | ⋮ |
| N-1 | N (SPARE) | N/A |
| N | 3 | 60,000-79,999 |

| Physical Band | Logical Band | LBA Range |
|---|---|---|
| 0 | 4 | 80,000-99,999 |
| 1 | 2 | 40,000-59,999 |
| 2 | 0 | 0-19,999 |
| 3 | N-1 | 210,000-229,999 |
| 4 | 1 | 20,000-39,999 |
| ⋮ | ⋮ | ⋮ |
| N-1 | N (SPARE) | N/A |
| N | 3 | 60,000-79,999 |

| Physical Band (520) | Logical Band (620) | LBA Range (1002) |
|---|---|---|
| 0 | 4 | 80,000-99,999 |
| 1 | 2 | 40,000-59,999 |
| 2 | 0 | 0-19,999 |
| 3 | N-1 | 210,000-229,999 |
| 4 | 1 | 20,000-39,999 |
| ⋮ | ⋮ | ⋮ |
| N-1 | N-1 | 210,000-229,999 |
| N | 3 | 60,000-79,999 |

FIG. 10C

| Physical Band (520) | Logical Band (620) | LBA Range (1002) |
|---|---|---|
| 0 | 4 | 80,000-99,999 |
| 1 | 2 | 40,000-59,999 |
| 2 | 0 | 0-19,999 |
| 3 | N (SPARE) | N/A |
| 4 | 1 | 20,000-39,999 |
| ⋮ | ⋮ | ⋮ |
| N-1 | N-1 | 210,000-229,999 |
| N | 3 | 60,000-79,999 |

FIG. 10D

SMR DRIVE THAT MAINTAINS PHYSICAL LOCATIONS OF BANDS VIA FLUSH/COPY OPERATIONS

BACKGROUND

Magnetic hard disk drives (HDDs) have been employed in information technology as a low-cost means for providing random access to large quantities of data. Consequently, as digital technologies have greatly expanded the need for data storage in all aspects of modern life, areal density of information stored in HDDs has continuously increased. However, there is a physical limitation for the minimum width of a write head when using conventional data recording techniques, such as perpendicular magnetic recording (PMR). This minimum width has prevented further decreases in written track width and areal density of HDDs, even though the width of a read head can be further reduced.

A recently developed technology that has further increased the areal density of magnetic HDDs is shingled magnetic recording (SMR). In an HDD that employs SMR, adjacent data tracks on a magnetic disk are each written (one group at a time) so as to overlap, and therefore overwrite, a portion of the previously written data track. As a result, the data tracks written in an SMR HDD are compressed in width to allow for increased data density in an HDD.

Once a data track is written in a shingled structure, that data track cannot be updated in place because that would overwrite and destroy data in one or more adjacent and overlapping data tracks. That is, random block overwrites cannot be performed on shingled data tracks without disturbing existing data. To avoid re-writing an entire group, or "band," of shingled data tracks each time a host requests an overwrite of data within that group of tracks, data associated with write requests are commonly stored in a so-called "media cache." Typically, the media cache is located in a conventional magnetic recording (CMR) region of the HDD, thereby allowing random block writes to the HDD. Data from separate write requests to different logical blocks may be written in a single set of contiguous blocks in the media cache, greatly increasing the random write performance of the HDD. Further, if all writes to the media cache are sequential in nature, then it is not necessary for the media cache to be located in a CMR region of the drive. In either case, data associated with write requests and stored in the media cache can be later written into the appropriate SMR region of the HDD along with other write data associated with that SMR region. Thus, application of an on-disk media cache enables the random write performance of an SMR HDD to match or even exceed that of a CMR HDD.

In certain situations, data stored via SMR can be more time-consuming to read than data stored in a CMR HDD, since the logical locality within a set of data stored in an SMR HDD does not always translate into physical locality of the various physical locations in the SMR HDD that store that set of data. That is, the logical block addresses (LBAs) associated with the set of data can be a single contiguous group of LBAs, and therefore logically proximate each other, while the physical sectors storing the set of data can be distributed across multiple non-contiguous regions of the SMR recording medium. This is because, in an SMR HDD, LBAs are typically grouped into logical bands that are each temporarily associated with a particular physical band of data tracks. Each time a logical band is updated with new data from the media cache, the logical band is associated with a new physical band of data tracks, and the updated data for that logical band is written to the new physical band. The new physical band is a currently available physical band of data tracks (referred to as a "spare band") that stores no valid data. Because the physical location of the spare band can be anywhere within a Head/Zone region of the SMR HDD, data for two logical bands that are adjacent to each other in LBA-space may be stored in sectors that are physically far apart in the SMR HDD. Typically, a host computer or other user of the SMR HDD operates under the assumption that random accesses within the LBAs associated with a set of data that spans a relatively small number of logical blocks can be performed quickly. In practice, however, when the set of data is associated with LBAs that span two or more logical bands that are not stored in adjacent physical bands, random accesses within those LBAs typically requires time-consuming seeks that significantly degrade performance.

SUMMARY

One or more embodiments provide systems and methods for storing data in a shingled magnetic recording (SMR) hard disk drive (HDD). Under various conditions, the SMR HDD performs additional SMR band copy and/or flush operations to ensure that data associated with logical bands that are adjacent or proximate in logical space are stored in physical locations in the SMR HDD that are proximate in physical space. As a result, efficient execution is ensured of read commands that span multiple logical bands of the SMR HDD.

According to an embodiment, a method of flushing data stored in a media cache of a shingled magnetic recording region (SMR) disk drive to at least one of a plurality of physical bands of the SMR disk drive is described, where each of the physical bands is initially associated with one of a plurality of logical bands. The method includes selecting target data stored in the media cache to be flushed; determining a logical band of the target data and a first physical band in which other data of the logical band are stored; determining a second physical band which is initially associated with the logical band; copying data stored in the second physical band to a spare band; merging the target data of the logical band with the other data of the logical band; and storing the merged data in the second physical band According to an embodiment, a method of storing data in a disk drive that includes a plurality of physical bands that are each configured to store data associated with one logical band is described, where each physical band has a unique physical position identifier associated therewith that indicates a physical position of the physical band relative to other physical bands in the plurality of physical bands. The method includes determining a first physical band in the plurality of physical bands that is currently associated with a spare logical band; determining a first value of a physical position identifier of the first physical band; selecting a target logical band from a plurality of logical bands associated with a single data zone of the disk drive, based on a second value of a logical position identifier of the target logical band that is equal to the first value; copying data associated with the target logical band from a second physical band in the plurality of physical bands to the first physical band.

A disk drive, according to another embodiment, comprises a shingled magnetic recording (SMR) region that includes a plurality of physical bands, wherein each of the physical bands is initially associated with one of a plurality of logical bands; a media cache; and a controller. The controller is configured to select target data stored in the media cache to be flushed; determine a logical band of the target data and a first physical band in which other data of the logical band are stored; determine a second physical band which is initially associated with the logical band; copy data stored in the second physical band to a spare band; merge the target data of the logical band with the other data of the logical band; and store the merged data in the second physical band, wherein if the second physical band is not a spare band, the controller copies data stored in the second physical band to the spare band.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

FIGS. 8A-8F each set forth a table mapping physical bands of an HDD to logical bands of the HDD during the various method steps, according to an embodiment.

FIGS. 10A-10D each set forth a table mapping physical bands of an HDD to logical bands of the HDD during the various method steps, according to an embodiment.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
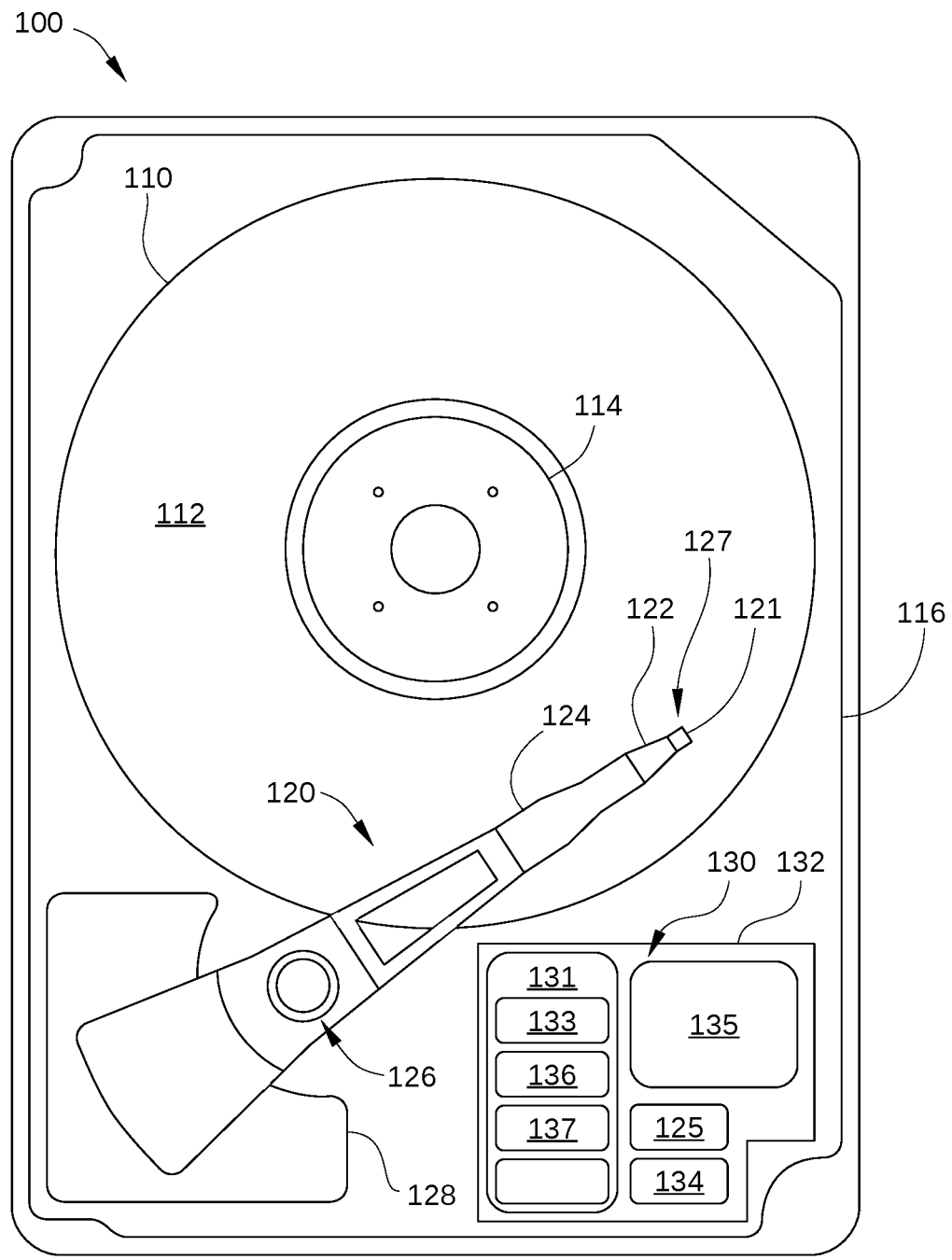
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes multiple sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126. Voice coil motor 128 moves all of the multiple sliders 121 radially relative to a recording surface 112 of a storage disk 110, thereby positioning read/write head 127 over a desired concentric data storage track. Spindle motor 114, read/write head 127, and voice coil motor 128 are coupled to electronic circuits 130, which are mounted on a printed circuit board 132. In some embodiments, each read/write head 127 has an associated additional actuator. The additional actuator (not shown in FIG. 1) could be on the suspension (i.e., flexure arm 122), at the gimbal between the suspension and slider 121, or even on slider 121, and can move the associated read/write head 127 radially a small distance. Such actuators are generally referred to as dual-stage actuators, and enable the servo system of HDD 100 to attain more accurate tracking control.

Electronic circuits 130 include a read channel 137, a microprocessor-based controller 133, random-access memory (RAM) 134 (which may be a dynamic RAM and is used as one or more data buffers) and/or a flash memory device 135 and may also include a flash manager device 136. In some embodiments, read channel 137 and microprocessor-based controller 133 are included in a single chip, such as a system-on-chip 131. In some embodiments, HDD 100 may further include a motor-driver chip 125 that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on either base plate 116, actuator arm 120, or both.

When data are transferred to or from a particular storage disk 110 of HDD 100, actuator arm assembly 120 moves in an arc between the inner diameter (ID) and the outer diameter (OD) of the storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and the attached read/write head 127 with respect to the particular storage disk 110. Voice coil motor 128 is coupled with a servo system that uses the positioning data read from servo wedges on storage disk 110 by read/write head 127 to determine the position of read/write head 127 over a specific data storage track. For example, the servo system positions read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, i.e., a position error signal (PES). The PES is typically generated by using servo patterns included in the servo wedges (not shown) on the recording surface 112 as a reference. One embodiment of a recording surface 112 is illustrated in FIG. 2.

Figure 2:
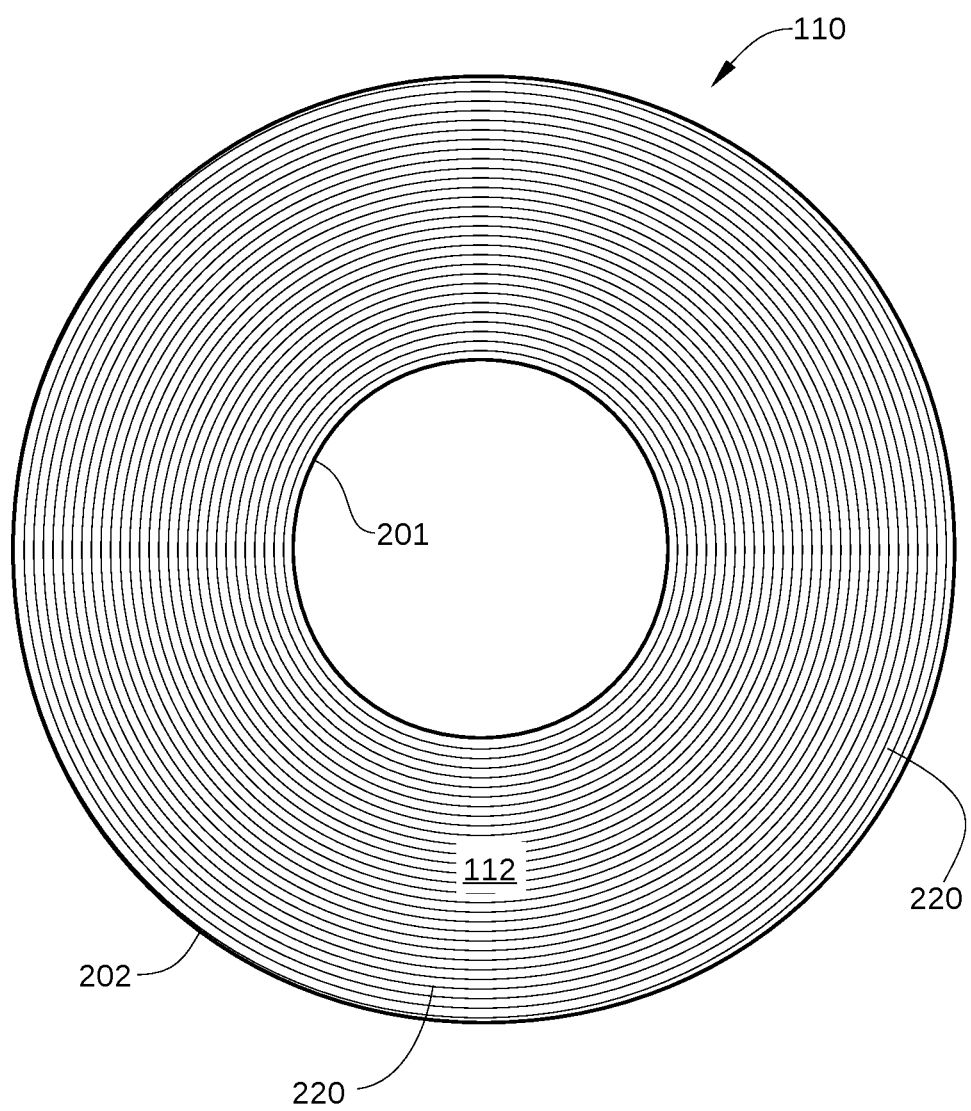
FIG. 2 schematically illustrates a recording surface of a storage disk with concentric data storage tracks formed thereon, according to an embodiment.

FIG. 2 schematically illustrates a recording surface 112 of a storage disk 110 with concentric data storage tracks 220 formed thereon, according to an embodiment. Data storage tracks 220 are formed on recording surface 112 between an ID 201 and an OD 202 of storage disk 110. Data storage tracks 220 are configured for storing data, and the radial position and track pitch, i.e., spacing, of data storage tracks 220 is defined by servo sectors (not shown) formed on recording surface 112. Each servo sector contains a reference signal that is read by read/write head 127 during read and write operations to position read/write head 127 above a desired data storage track 220. Typically, the actual number of data storage tracks 220 included on recording surface 112 is considerably larger than illustrated in FIG. 2. For example, recording surface 112 may include hundreds of thousands of concentric data storage tracks 220. The majority of data storage tracks 220 are disposed in a user region of recording surface 112, while the remainder of data storage tracks 220 are disposed in a media-cache region, as shown in FIG. 3.

Figure 3:
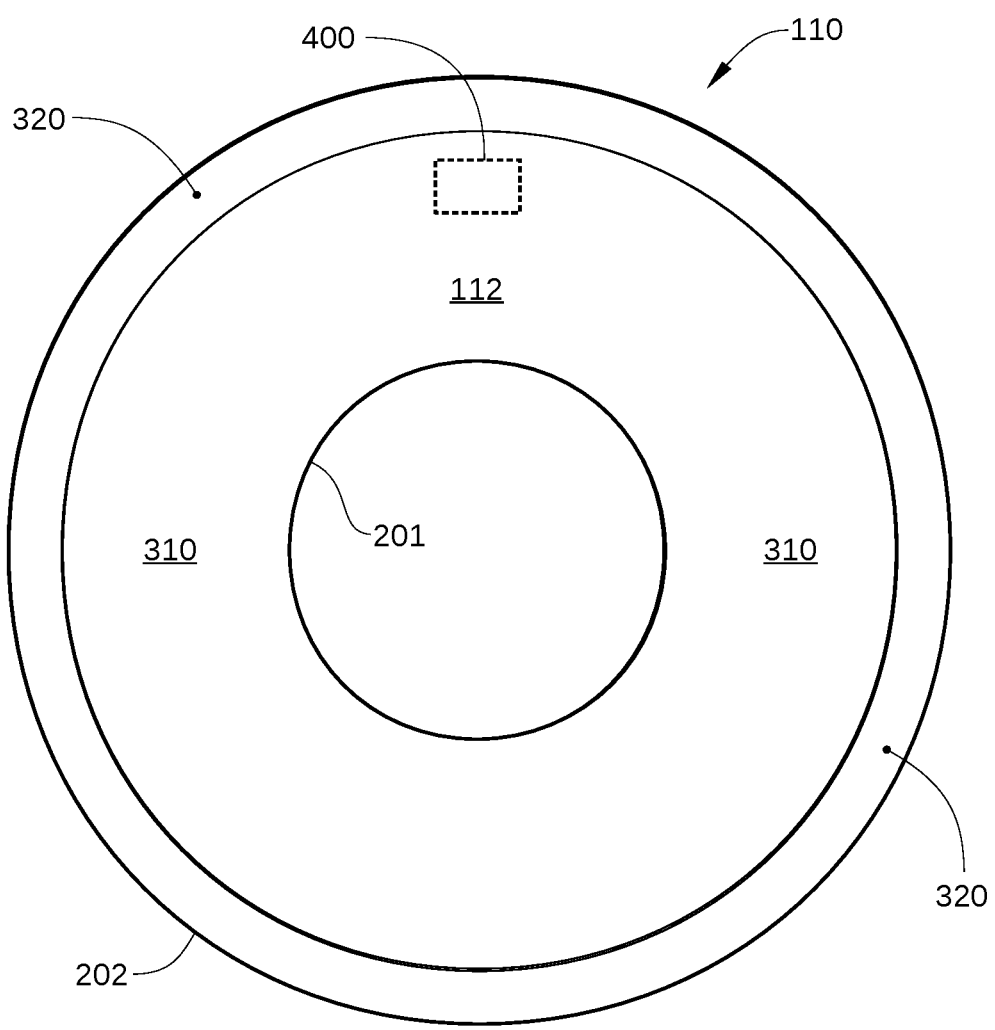
FIG. 3 schematically illustrates a user region of a recording surface and a media-cache region of the recording surface, according to an embodiment.

FIG. 3 schematically illustrates a user region 310 of recording surface 112 and a media-cache region 320 of recording surface 112, according to an embodiment. For clarity, data storage tracks 220 formed on recording surface 112 are not shown in FIG. 3. In the embodiment illustrated in FIG. 3, media-cache region 320 is disposed proximate OD 202 of recording surface 112 and user region 310 includes the remainder of recording surface 112. In other embodiments, media-cache region 320 may be disposed in any other region of recording surface 112, for example in a region proximate ID 201, and/or in a middle diameter (MD) region of recording surface 112, or even distributed across a number of regions between the OD 202 and ID 201. Generally, user region 310 includes the majority of the storage capacity of recording surface 112.

User region 310 is a shingled magnetic recording (SMR) region of recording surface 112 that includes data storage tracks 220 that are arranged in groups, or "bands," of data storage tracks. Each band of data storage tracks is typically separated from adjacent bands by guard regions, which are inter-band gaps in which no data tracks are formed. Further, the data storage tracks formed in user region 310 are written in an SMR format, and therefore overlap adjacent data tracks in the same band. Thus, each band in user region 310 includes a plurality of overlapping data tracks that each have a width that is significantly narrower than a width of the write element included in read/write head 127. One embodiment of such a band is illustrated in FIG. 4.

Figure 4:
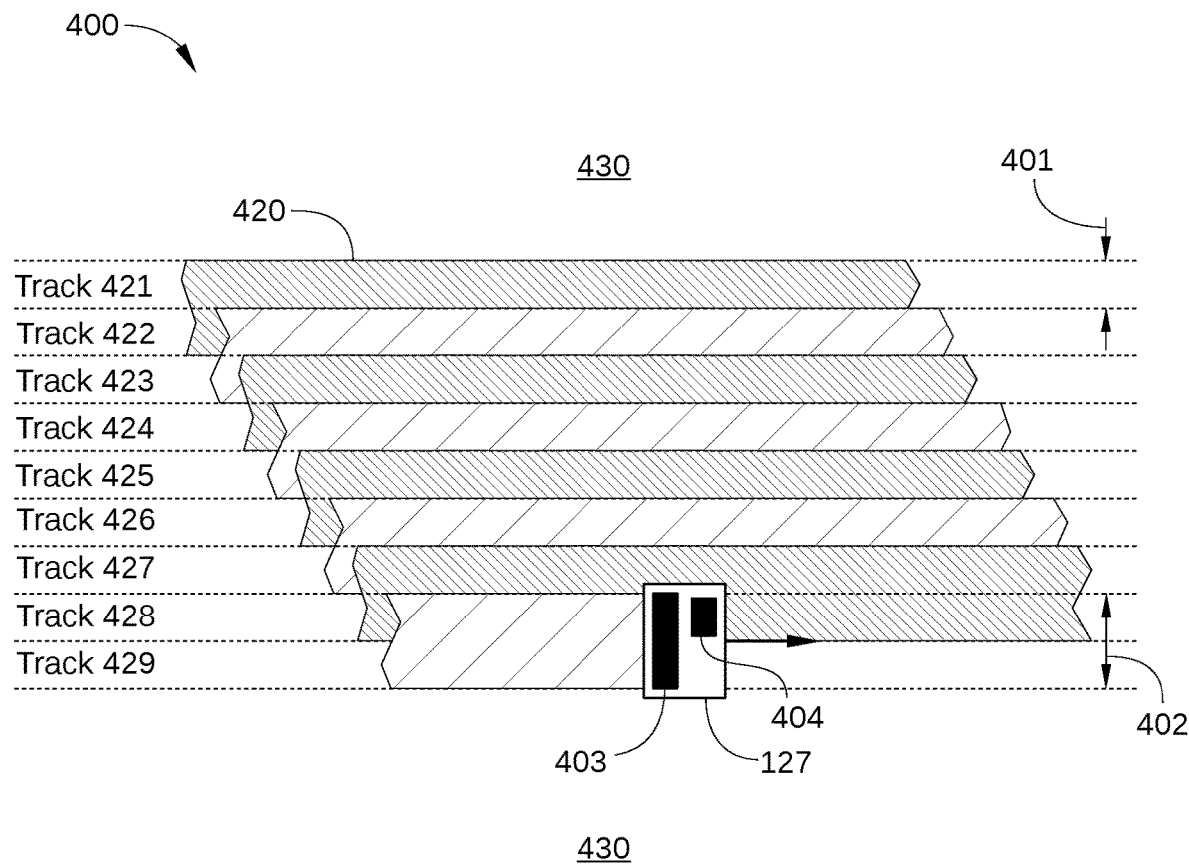
FIG. 4 is a schematic illustration of a portion of recording surface indicated in FIG. 3 that includes a band of SMR data tracks, according to an embodiment.

FIG. 4 is a schematic illustration of a portion 400 of recording surface 112 indicated in FIG. 3 that includes a band 420 of SMR data tracks, according to an embodiment. Band 420 includes a plurality of SMR data tracks 421-429, and is separated from adjacent bands (not shown) by guard regions 430. As shown, each of SMR data tracks 421-429 overlaps and/or is overlapped by at least one adjacent SMR data track. As a result, each of SMR data tracks 421-429 has a readable width 401 that is significantly less than an as-written width 402. It is noted that in the embodiment illustrated in FIG. 4, band 420 only includes nine SMR data tracks, whereas in practice band 420 may include up to one hundred or more SMR data tracks.

Also shown in FIG. 4 is read/write head 127, which is configured with a write head 403 and a read head 404 that are each designed for SMR. As such, read head 404 is configured with a width that is approximately equal to readable width 401, and is positioned within read/write head 127 to facilitate reading of SMR data tracks 421-429. Furthermore, write head 403 is positioned within read/write head 127 to facilitate writing of SMR data tracks 421-429 with as-written width 402. In accordance with the principle of SMR, as-written width 402 exceeds readable width 401, for example by a factor of two. Thus, as a particular one of SMR data tracks 421-429 is written, write head 403 is positioned to overlap a significant portion of the preceding SMR data track.

Returning to FIG. 3, media-cache region 320 is configured to store media-cache entries during normal operation of HDD 100. As such, media-cache region 320 includes conventional data storage tracks, i.e., data storage tracks that are not written in an SMR format and instead are written in a conventional magnetic recording (CMR) format, and therefore are substantially non-overlapping. Thus, media-cache region 320 can be used to store random block writes without an entire band of shingled tracks being re-written for each write command received. For example, when HDD 100 receives a write command that includes write data and a range of logical block addresses (LBAs) indicated in user region 310 for the storage of the write data, the write data can be written to a physical location in media-cache region 320 rather than to the physical locations of user region 310 that correspond to the LBA range referenced in the write command. The physical location in media-cache region 320 is mapped to the LBAs associated with the write data, so that the write data can be retrieved based on LBAs included in a subsequent read command. It is noted that, in some embodiments, some or all of the media cache for HDD 100 may be implemented in an SMR region rather than exclusively in a CMR region.

Write data stored in media-cache region 320 can be flushed to an appropriate band in user region 310 periodically, in response to one or more specified events, or at any other convenient time. For instance, when a particular band in user region 310 is determined to store a quantity of invalid data that exceeds a predetermined threshold quantity, data stored in that particular band can be updated by re-writing the entire band to include the most recent version of any invalid data. Thus, that particular band is rewritten to include write data that are stored in media-cache region 320 and are mapped to LBAs in that band. In addition, if the media-cache region becomes full (or nearly full), data that are stored only in media-cache 320 can be flushed to user region 310 to make more room in media-cache region 320. Generally, each block or set of data being flushed to user region 310 is associated with a particular LBA.

Figure 5:
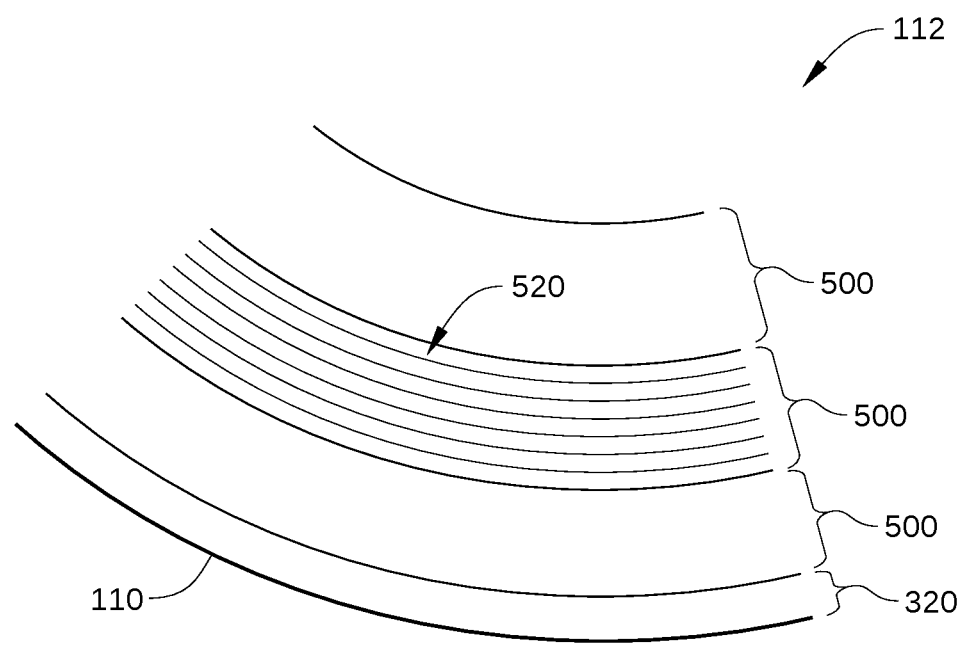
FIG. 5 is a schematic illustration of a plurality of data zones on a recording surface of an SMR HDD, according to an embodiment.

In an SMR HDD, such as HDD 100, LBAs are typically organized in band-sized units referred to herein as logical bands. Each such logical band is mapped to one of the physical bands of HDD 100, such as band 420 in FIG. 4. The physical bands of HDD 100 are organized in data zones, as shown in FIG. 5. FIG. 5 schematically illustrates physical bands 520 arranged in data zones 500 on a portion of recording surface 112, according to various embodiments. For clarity, only three data zones 500 are shown on recording surface 112 in FIG. 5, but in practice many more than three data zones 500 are typically included on a single recording surface 112 of HDD 100. In embodiments in which HDD 100 records data on multiple recording surfaces 112, then data zones 500 on each recording surface 112 with similar radial displacement from the center of rotation of storage disks 110 can be considered to be in the same data zone 500. The data on a single surface of a specific data zone are generally referred to by the head number and the data zone number, and are sometimes referred to as a specific head/zone. As shown, each data zone 500 includes a plurality of physical bands 520. For example, in some embodiments, each data zone 500 includes on the order about 90 to 120 physical bands 520. The number of physical bands 520 included in each data zone 500 can vary.

When data associated with a logical band is rewritten with new data, for example when media cache entries for LBAs included in the logical band are flushed to the logical band, the physical band 520 mapped to the logical band is generally not overwritten. Instead, the new data for the logical band is read and then copied to a so-called "spare" physical band 520, which is a physical band 520 that is mapped to a spare logical band and is available to store the data for the logical band that is being rewritten. Thus, the data associated with the logical band are rewritten to different physical locations within the current data zone. As a result, data for two logical bands that are adjacent to each other in LBA space may be stored in sectors that are physically far apart in HDD 100, as illustrated in FIGS. 6A and 6B.

Figure 6A:
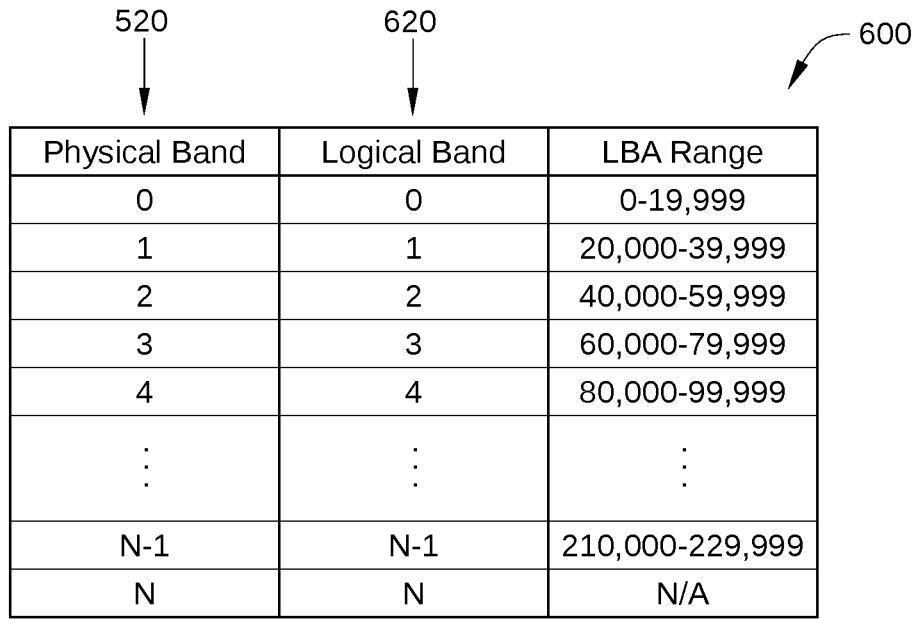
FIG. 6A is a table that sets forth a mapping of physical bands of an HDD to logical bands of the HDD prior to any of the logical bands being rewritten, according to an embodiment.

FIG. 6A is a table 600 that sets forth a mapping of physical bands 520 of HDD 100 to logical bands 620 of HDD 100 prior to any of logical bands 620 being rewritten, according to an embodiment. As shown, each logical band 620 is mapped to (i.e., initially associated with) a single physical band 520. In addition, a unique range of LBAs is mapped to each logical band 620. Because none of logical bands 620 have been rewritten, the data associated with logically contiguous LBAs are stored in physically contiguous sectors of HDD 100. It is noted that because logical band N is the spare logical band, no LBAs are associated therewith.

Figure 6B:
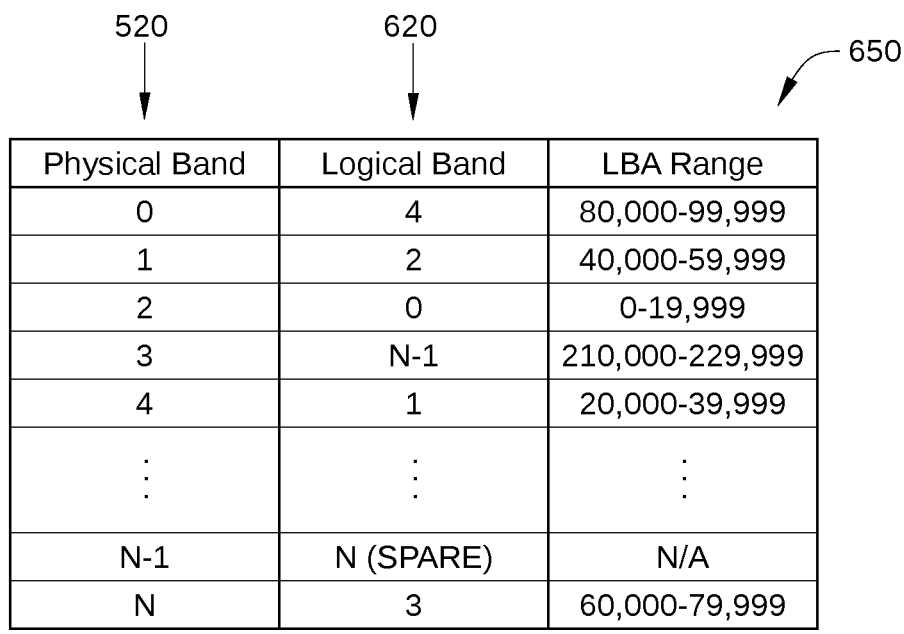
FIG. 6B is a table that sets forth a mapping of physical bands of an HDD to logical bands of the HDD after most or all of the logical bands have been rewritten at least once, according to an embodiment.

FIG. 6B is a table 650 that sets forth a mapping of physical bands 520 of HDD 100 to logical bands 620 of HDD 100 after most or all of the logical bands 620 have been rewritten at least once, according to an embodiment. That is, the data associated with each of logical bands 620 have been updated at least once with new data and/or have been copied to a different physical band 520. For example, when an adjacent track interference (ATI) threshold is surpassed for data associated with a particular logical band 620, that logical band is typically copied to a different physical band 520. As shown, each logical band 620 is still mapped to a single physical band 520. However, data associated with a logically contiguous range of LBAs that spans more than a single logical band 620 can now be stored in physically distant sectors of HDD 100. For instance, a file stored in HDD 100 that spans LBAs 75,000 to 85,000 includes data that are stored in physical band 0 and N, which can be at opposite ends of the data zone 500 that includes physical bands 520. As a result, random accesses within this LBA range can result in poor performance of HDD 100.

According to various embodiments, HDD 100 performs additional SMR band copy and/or flush operations to ensure that data associated with logical bands 620 that are proximate in logical space are stored in physical bands 520 that are proximate in physical space. As a result, efficient execution is ensured of read commands that span multiple logical bands of the SMR HDD. In some embodiments, the physical storage locations of some or all logical bands in a particular data zone of HDD 100 are reordered so that the data for logical bands that are adjacent in logical space are stored in physical bands that are adjacent in physical space. In such embodiments, the reordering is performed when data in media-cache region 320 that are associated with a particular logical band are flushed to a physical band in user region 310. That is, the reordering is performed when such data in media-cache region 310 are used to update data associated with that particular logical band and stored in a new physical band in user region 310. One such embodiment is described below in conjunction with FIG. 7.

Figure 7:
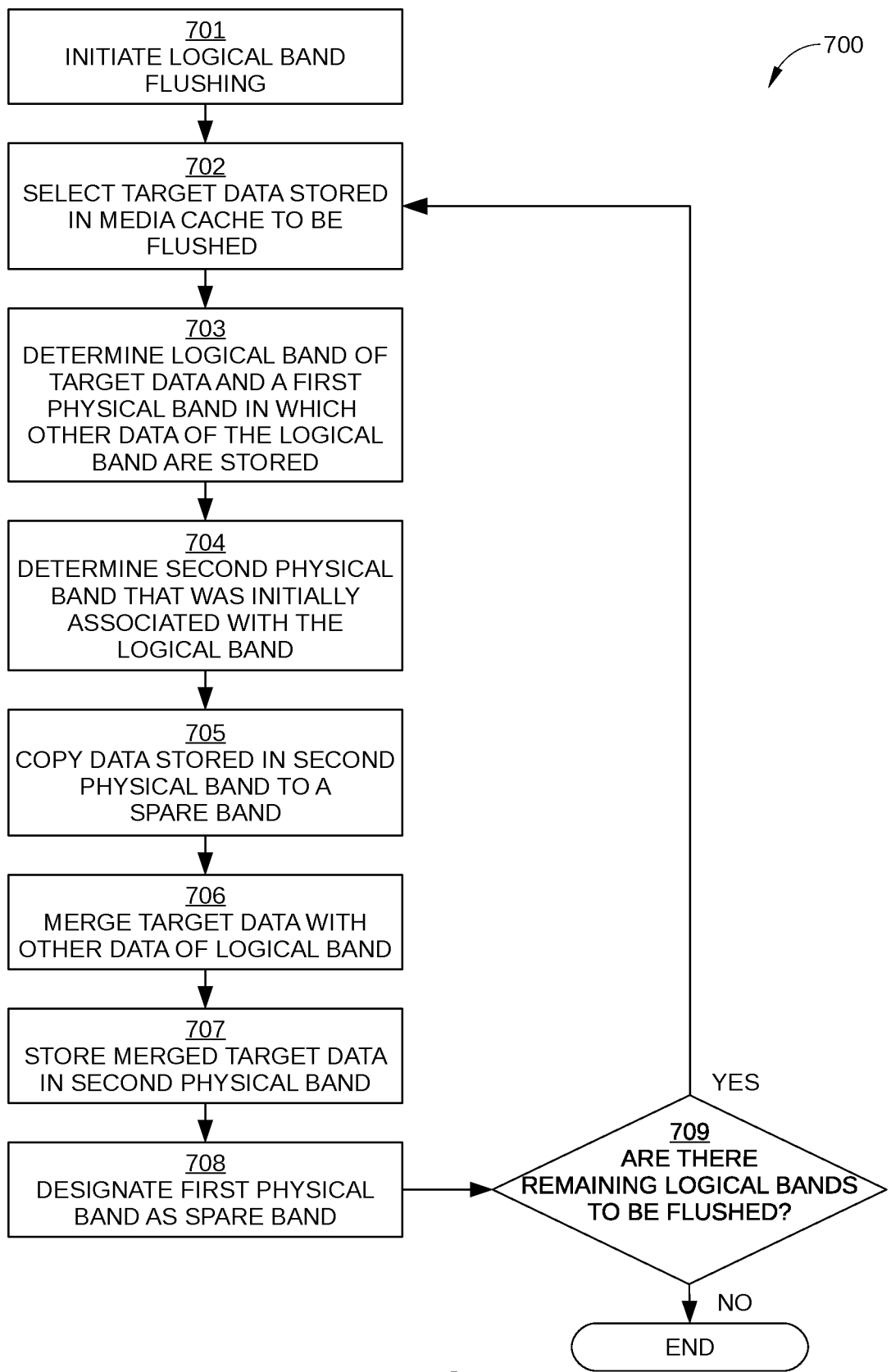
FIG. 7 sets forth a flowchart of method steps for flushing data stored in a media cache of an SMR disk drive to at least one of a plurality of physical bands of the SMR disk drive, according to an embodiment.

FIG. 7 sets forth a flowchart of method steps for flushing data stored in a media cache of an SMR disk drive to at least one of a plurality of physical bands of the SMR disk drive, according to an embodiment. Although the method steps are described in conjunction with HDD 100 in FIGS. 1-6B, persons skilled in the art will understand that the method steps may be performed with other types of systems. FIGS. 8A-8F each set forth a table 800 mapping physical bands 520 of HDD 100 to logical bands 620 of HDD 100 during the various method steps, according to an embodiment. The control algorithms for the method steps reside in microprocessor-based controller 133 in whole or in part as software- or firmware-implemented logic, and/or as hardware-implemented logic circuits.

As shown, a method 700 begins at step 701, when microprocessor-based controller 133 initiates the flushing process of method 700. When method 700 is initiated, some or all of logical bands 620 are "out of order." A logical band is considered out of order when data for the logical band is stored in a physical band that was not initially associated with that logical band. In other words, a logical band is considered out-of-order when the value of the physical position indicator of the physical band storing data of the logical band 520 does not equal the value of the logical position indicator for the logical band 620. In addition to indicating the physical band to which that logical band is initially associated, the logical position indicator for each logical band of a particular data zone also indicates a logical position of the logical band in the plurality of logical bands. Similarly, in addition to indicating the logical band to which that physical band is initially associated, the physical position indicator for each physical band of the particular data zone also indicates a physical position of the physical band in the plurality of physical bands.

In some embodiments, method 700 is initiated in response to various events, including when HDD 100 enters an idle mode and/or when one or more predetermined thresholds are determined to be exceeded. Examples of such predetermined thresholds include a maximum overall quantity of data stored in media-cache region 320, a maximum quantity of data stored in media-cache region 320 for one or more of physical bands 520, a maximum number of logical bands 620 for a particular data zone 500 for which data are stored in media-cache region 320, a number of physical bands 520 determined to store data associated with an out of order logical band, and the like.

In step 702, microprocessor-based controller 133 selects target data stored in the media cache to be flushed, as shown in FIG. 8A. In FIG. 8A, the LBA range 801 that includes the target data is indicated. In the embodiment illustrated in FIG. 8A, LBA range 801 is included in logical band 0. In some embodiments, the target data can be selected in step 702 based on any suitable criterion or criteria, including least recently used (read or written) data, least recently written data, least frequently used data, the most data that are associated with a single logical band, and the like.

In step 703, microprocessor-based controller 133 determines a logical band 802 of the target data 801 and a first physical band 803 in which other data of the logical band are stored, as shown in FIG. 8B.

In step 704, microprocessor-based controller 133 determines a second physical band 804 which is initially associated with the logical band 802, as shown in FIG. 8C. In FIG. 8C, second physical band 804 is selected because the logical band of the target data (i.e., logical band 0) has a logical position indicator with a value of 0, while second physical band 804 has a physical position identifier of 0. As noted above when the value of the physical position indicator of second physical band 804 equals the value of the logical position indicator for logical band 801, second physical band 804 (i.e., physical band 0) was initially associated with logical band 802 (i.e., logical band 0).

In step 705, microprocessor-based controller 133 copies data stored in the second physical band 804 (in this case physical band 0) to a spare band (in this case physical band N−1), as shown in FIG. 8D. That is, the data stored in physical band 0, which in FIG. 8D are indicated by LBAs 80,000-999,999, are read from physical band 0 and written to physical band N−1.

In step 706, microprocessor-based controller 133 merges the target data of logical band 802 (i.e., the target data 801 stored in the media cache and selected in step 702 to be flushed) with the other data of logical band 802 (i.e., the data stored in first physical band 803). Thus, the target data 801 are used to update (or replace) the corresponding data of logical band 802.

In step 707, microprocessor-based controller 133 stores the merged data in second physical band 804, as shown in FIG. 8E.

In step 708, microprocessor-based controller 133 designates the first physical band 801 as the spare band, as shown in FIG. 8F.

In step 709, microprocessor-based controller 133 determines whether there are any remaining logical bands that need to be flushed. In some embodiments the logical bands to be flushed can include any logical bands for which data are stored in the media cache 320. If yes, the method proceeds back to step 702; if no, the method terminates.

As described above, the execution of steps 702-708 result in the data of logical band 0 being stored in physical band 0. Each additional iteration of steps 702-708 then potentially reorders the physical position of another logical band. Thus, the implementation of method 700 can reorder some or all of the logical bands in a data zone of HDD 100, so that some or all of the data stored in that data zone are physically proximate to data that are logically proximate. It is noted that if data for a given logical band is already in the "correct" physical band and data need to be flushed from media cache via method 700 to update that logical band, a copy of the data of that correctly located logical band is written to the spare band. The appropriate media cache data are then merged with the data just written to the spare band and flushed to the "correct" physical location for that logical block (as described above in method 700). In such a case, the logical band that was already correctly located is effectively "reordered" to the same physical location, but updated with new data from the media cache.

In some embodiments, the physical storage locations of some or all logical bands in a particular data zone of HDD 100 are reordered by a series of copy band operations, so that the data for logical bands that are adjacent in logical space are stored in physical bands that are adjacent in physical space. In such embodiments, the reordering can be performed when there are little or no data in media-cache region 320 that are associated with logical bands of HDD 100. For example, such reordering can be performed after data stored in media-cache region 320 have been flushed to the appropriate physical bands in user region 310. One such embodiment is described below in conjunction with FIG. 9.

Figure 9:
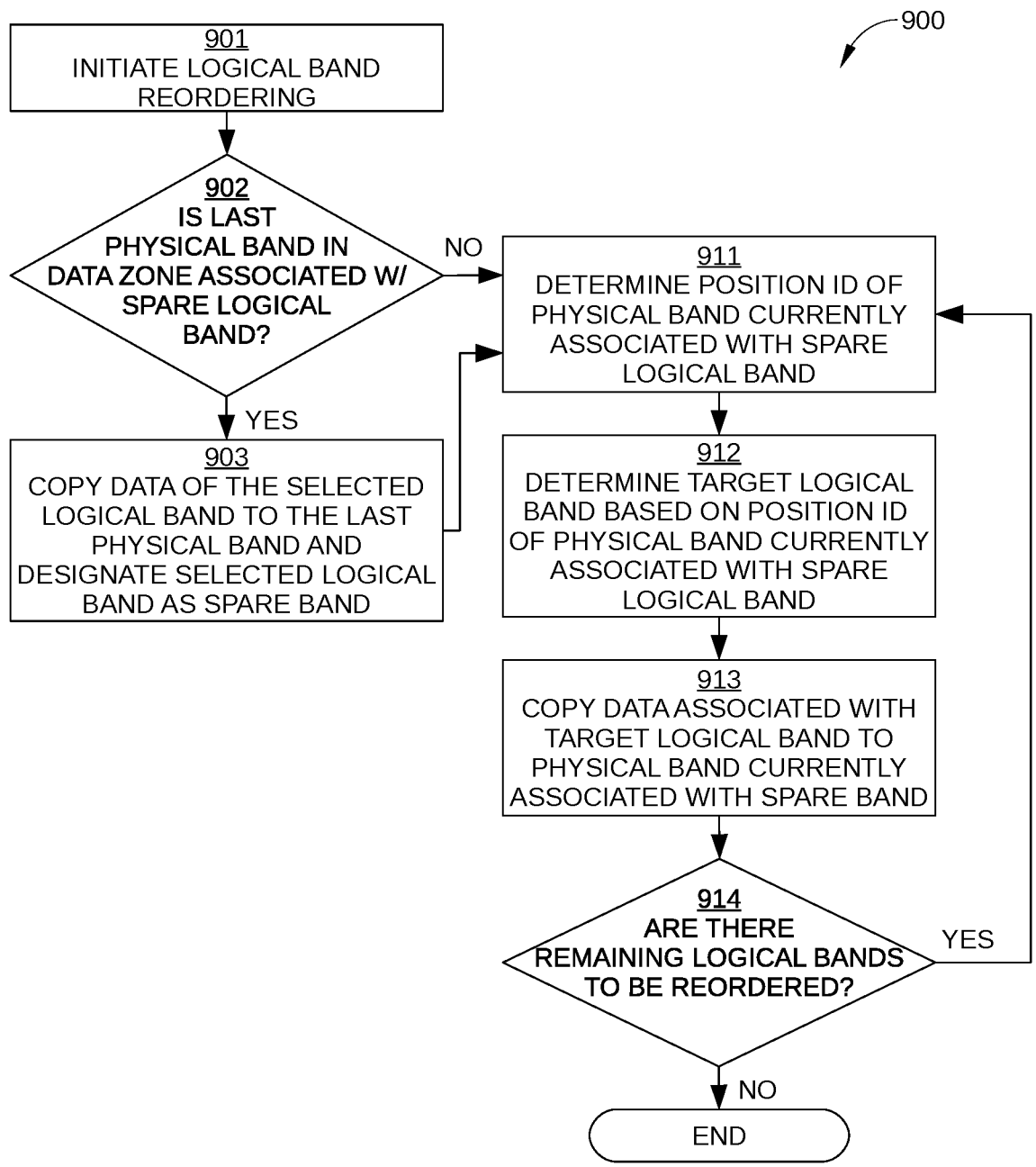
FIG. 9 sets forth a flowchart of method steps for storing data in a disk drive that includes a plurality of physical bands that are each configured to store data associated with one logical band, according to an embodiment.

FIG. 9 sets forth a flowchart of method steps for storing data in a disk drive that includes a plurality of physical bands that are each configured to store data associated with one logical band, according to an embodiment. Although the method steps are described in conjunction with HDD 100 in FIGS. 1-6B, persons skilled in the art will understand that the method steps may be performed with other types of systems. FIGS. 10A-10D each set forth a table 1000 mapping physical bands 520 of HDD 100 to logical bands 620 of HDD 100 during the various method steps, according to an embodiment. The control algorithms for the method steps reside in microprocessor-based controller 133 in whole or in part as software- or firmware-implemented logic, and/or as hardware-implemented logic circuits.

As shown, a method 900 begins at step 901, when microprocessor-based controller 133 initiates the reordering process of method 900. In some embodiments, method 900 is initiated in response to similar events set forth above in conjunction with method 700.

In step 902, microprocessor-based controller 133 determines whether the last physical band of the data zone is associated with the spare logical band. If no, method 900 proceeds to step 911; if yes, method 900 proceeds to step 903.

In step 903 microprocessor-based controller 133 selects any logical band of the data zone besides the spare logical band. Microprocessor-based controller 133 then copies the data of the selected logical band to the last physical band of the data zone, and designates the physical band that was previously occupied by the selected logical band as the spare band. Method 900 then proceeds to step 911.

In step 911, microprocessor-based controller 133 determines the position ID of a physical band 1001 currently associated with the spare logical band (in this case physical band N−1), as shown in FIG. 10A.

In step 912, microprocessor-based controller 133 determines a target logical band 1002 based on the position ID of physical band 1001 currently associated with the spare logical band, as shown in FIG. 10B. In the embodiment illustrated in FIG. 10B, the position ID of physical band 1001 is N−1.

In step 913, microprocessor-based controller 133 copies data 1003 associated with target logical band 1002 to the physical band 1001 currently associated with the spare band logical band, as shown in FIG. 10C. The physical band that originally stored data 1003 associated with target logical band 1002 now becomes the physical band storing the spare logical band, as shown in FIG. 10D.

In step 914, microprocessor-based controller 133 determines whether there are any remaining logical bands to be reordered. If yes, method 900 proceeds back to step 911; if no method 900 terminates.

The implementation of method 900 can reorder some or all of the logical bands in a data zone of HDD 100, for example when HDD 100 is in an idle mode, and/or after HDD 100 has completed flushing data from media cache region 320 to user region 310.

In an embodiment, HDD 100 can use the method described in FIG. 7 when flushing data from media cache, and can use the method described in FIG. 9 when there is no data to flush from media cache, but HDD 100 still has logical bands that do not occupy the corresponding physical bands. In another embodiment, HDD 100 can use the method described in FIG. 7 when flushing data from media cache, but the media cache does not contain data to be flushed for more than a specified number of logical bands. The latter strategy might be used to speed up flushing of data from the media cache when there are many logical bands of data to be flushed. Because the method described in FIG. 7 involves more disk accesses than would be necessary to simply flush data from media cache region 320 to user region 310, in some embodiments HDD 100 might be configured to flush data from media cache to user region 310 without forcing alignment between logical bands and physical bands when HDD 100 has a large amount of flushing work to do. In such a situation, HDD 100 could mark head/zone pairs to which media cache data was flushed without aligning logical and physical bands. In some embodiments, HDD 100 could later use the method described in FIG. 9 to reorder the bands in any head/zone that contains such marked logical bands.

While the foregoing is directed to embodiments of the present invention, other and further embodiments of the invention may be devised without departing from the basic scope thereof, and the scope thereof is determined by the claims that follow.

We claim:

1. A method of flushing data stored in a media cache of an SMR disk drive to at least one of a plurality of physical bands of the SMR disk drive, wherein each of the physical bands is initially associated with one of a plurality of logical bands, the method comprising:
   selecting target data stored in the media cache to be flushed;
   determining a logical band of the target data and a first physical band in which other data of the logical band are stored;
   determining a second physical band which is initially associated with the logical band;
   copying data stored in the second physical band to a spare band;
   merging the target data of the logical band with the other data of the logical band; and
   storing the merged data in the second physical band.

2. The method of claim 1, further comprising, after copying the data stored in the second physical band to the spare band, designating the first physical band as a new spare band.

3. The method of claim 1, further comprising:
   prior to selecting the target data in the media cache to be flushed, determining that first data stored in the media cache are associated with a specific logical band of the disk drive; and
   determining second data stored in a physical band in the plurality of physical bands are associated with the specific logical band.

4. The method of claim 1, wherein the plurality of physical bands are included in a single head/zone of the disk drive.

5. The method of claim 1, wherein when the copying of the data stored in the second physical band to the spare band begins, the spare band stores no data associated with any of the plurality of logical bands.

6. The method of claim 1, wherein each physical band in the plurality of physical bands is disposed in an SMR region of the SMR disk drive.

7. The method of claim 1, wherein each physical band in the plurality of physical bands is disposed in a single head/zone of the disk drive.

8. The method of claim 1, wherein determining the second physical band which is initially associated with the logical band comprises:
   determining a first value of a logical position identifier of the logical band of the target data, wherein the logical position identifier indicates a logical position of the logical band of the target data band relative to other logical bands in the plurality of logical bands; and
   selecting the second physical band from the plurality of physical bands, based on a second value of a physical position identifier of the second physical band.

9. A method of storing data in a disk drive that includes a plurality of physical bands that are each configured to store data associated with one logical band, each physical band having a unique physical position identifier associated therewith that indicates a physical position of the physical band relative to other physical bands in the plurality of physical bands, the method comprising:
   determining a first physical band in the plurality of physical bands that is currently associated with a spare logical band;
   determining a first value of a physical position identifier of the first physical band;
   selecting a target logical band from a plurality of logical bands associated with a single data zone of the disk drive, based on a second value of a logical position identifier of the target logical band that is equal to the first value;
   copying data associated with the target logical band from a second physical band in the plurality of physical bands to the first physical band.

10. The method of claim 9, wherein the logical position identifier of the target logical band indicates a logical position of the target logical band in the plurality of logical bands.

11. The method of claim 9, wherein each physical band in the plurality of physical bands is disposed in the single data zone of the disk drive.

12. The method of claim 9, further comprising, prior to determining the first physical band in the plurality of physical bands that is currently associated with the spare logical band, determining that first data stored in a conventional recording region of the disk drive are associated with a logical band in the plurality of logical data.

13. The method of claim 12, further comprising, prior to the copying, reading the first data, wherein copying data associated with the target logical band to the target physical band comprises writing the first data to the target physical band.

14. A disk drive comprising:
   a shingled magnetic recording (SMR) region that includes a plurality of physical bands, wherein each of the physical bands is initially associated with one of a plurality of logical bands;
   a conventional magnetic recording (CMR) region that includes a media cache; and
   a controller configured to
      select target data stored in the media cache to be flushed;
      determine a logical band of the target data and a first physical band in which other data of the logical band are stored;
      determine a second physical band which is initially associated with the logical band;
      copy data stored in the second physical band to a spare band;
      merge the target data of the logical band with the other data of the logical band; and
      store the merged data in the second physical band, wherein if the second physical band is not a spare band, the controller copies data stored in the second physical band to the spare band.

15. The disk drive of claim 14, wherein the controller is further configured to, after copying the data stored in the second physical band to the spare band, designate the first physical band as a new spare band.

16. The disk drive of claim 14, wherein the controller is further configured to:
prior to selecting the target data in the media cache to be flushed, determine that first data stored in the media are associated with a specific logical band of the disk drive; and
determine second data stored in a physical band in the plurality of physical bands are associated with the specific logical band.

17. The disk drive of claim 14, wherein the plurality of physical bands are included in a single data zone of the disk drive.

18. The disk drive of claim 14, wherein when the controller begins copying the data stored in the second physical band to the spare band, the spare band stores no data associated with any of the plurality of logical bands.

19. The disk drive of claim 14, wherein each physical band in the plurality of physical bands is disposed in an SMR region of the SMR disk drive.

20. The disk drive of claim 14, wherein each physical band in the plurality of physical bands is disposed in a single data zone of the disk drive.

\* \* \* \* \*